United States Patent
Skotnicki et al.

[11] Patent Number: 5,713,447
[45] Date of Patent: Feb. 3, 1998

[54] SYNCHRONIZER WITH SELF-ENERGIZING

[75] Inventors: George Skotnicki, Rochdale; Timothy Edgar Jeremey Sinden, Altrincham, both of England

[73] Assignee: Eaton Corporation, Cleveland, Ohio

[21] Appl. No.: 690,091

[22] Filed: Jul. 31, 1996

[30] Foreign Application Priority Data

Aug. 11, 1995 [GB] United Kingdom ............... 9516492.7

[51] Int. Cl.⁶ ........................................... F16D 23/06
[52] U.S. Cl. ........................... 192/53.31; 192/53.331
[58] Field of Search ...................... 192/53.31, 53.331, 192/53.34, 54.5; 74/339

[56] References Cited

U.S. PATENT DOCUMENTS

| | | |
|---|---|---|
| 2,238,723 | 4/1941 | Fishburn . |
| 2,260,863 | 10/1941 | Orr . |
| 2,627,956 | 2/1953 | Perkins . |
| 2,942,712 | 6/1960 | Altmann . |
| 3,548,983 | 12/1970 | Hiraiwa . |
| 4,732,247 | 3/1988 | Frost . |
| 4,869,353 | 9/1989 | Ohtsuki . |
| 5,092,439 | 3/1992 | Reynolds . |
| 5,558,194 | 9/1996 | Cox ................................. 192/53.31 |
| 5,617,938 | 4/1997 | Tsukada et al. ................. 192/54.5 |

FOREIGN PATENT DOCUMENTS

| | | |
|---|---|---|
| 1044974 | 11/1953 | France . |
| 863501 | 3/1961 | United Kingdom . |

*Primary Examiner*—Rodney H. Bonck
*Attorney, Agent, or Firm*—Paul S. Rulon

[57] ABSTRACT

A pin-type, double-acting synchronizer mechanism (10) with friction clutches (26, 46 and 28, 48), jaw clutches (34d, 30a and 36d, 32a) and improved self-energizing ramps (70a–70d and 72a–72d). Three circumferentially spaced pins (50) include blocker shoulders for preventing asynchronous engagement of the jaw clutches and pre-energizer surfaces which each cooperate with a pre-energizer assembly (52). The self-energizing ramps act between a shaft (12) and a shift flange (42) which is rotatable relative to the shaft and jaw clutch members (34d, 36d). Flange (42) includes radially inwardly extending teeth (72) defining the self-energizing ramps (72a, 72d) which act against the self-energizing ramps (70a, 70d) defined by a post like portion (70) formed from shaft splines (13).

8 Claims, 5 Drawing Sheets

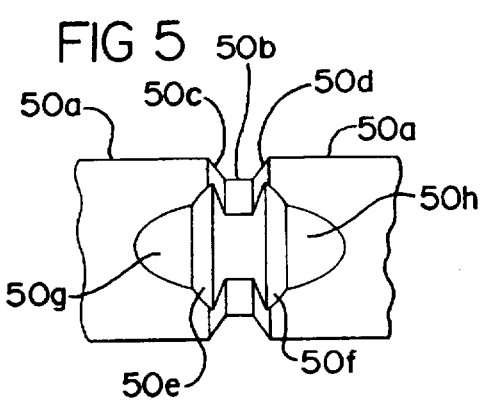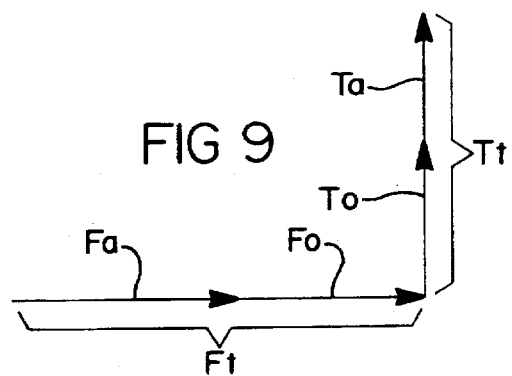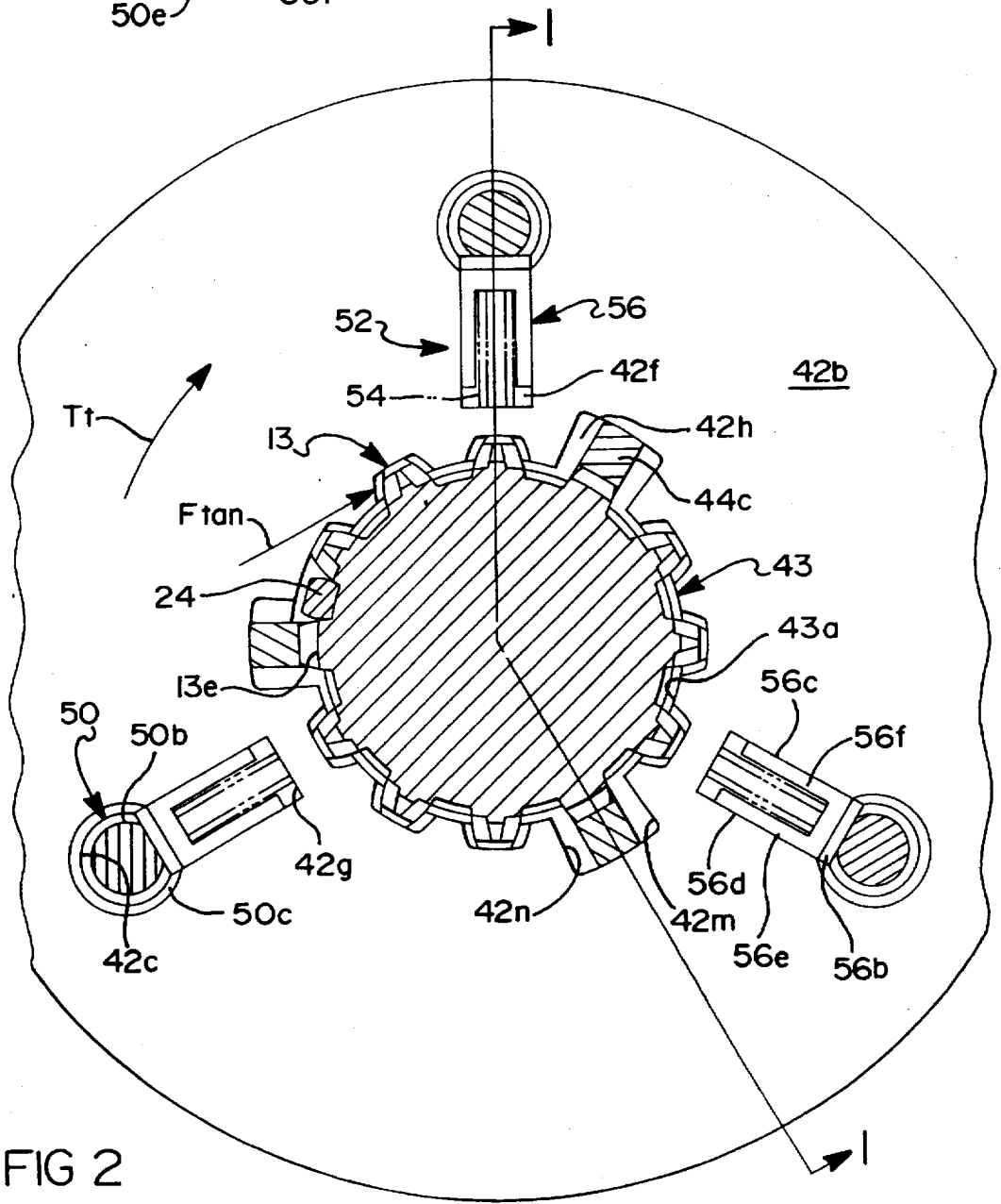

5,713,447

SYNCHRONIZER WITH SELF-ENERGIZING

FIELD OF THE INVENTION

This invention relates to a self-energizing synchronizer mechanism for a transmission. More specifically, the invention relates to such a mechanism having improved self-energizing ramp surfaces.

BACKGROUND OF THE INVENTION

It is well known in the multiple speed ratio transmission art that synchronizer mechanisms may be used to reduce shift time of all or some of the transmission gear ratios. It is also known that the shift effort required by a vehicle operator, i.e., force applied to a shift lever, may be reduced by use of synchronizer mechanisms of the self-energizing type. Since operator shift effort generally increases with vehicle size, synchronizer mechanisms of the self-energizing type are especially important for heavy duty trucks. Prior art examp mechanisms may be seen by reference to U.S. Pat. Nos. 2,410,511; 2,896,760; 3,548,983; 4,413,715; 4,732,247; 4,869,353 and 5,092,439 which are incorporated herein by reference.

The synchronizer mechanisms of the above patents include friction and jaw members for respectively synchronizing and positive clutching a gear to a shaft; blockers engaged in response to a pre-energizer effecting initial engagement of the friction members in response to initial engaging movement of one of the jaw members by a shift force, the blockers being operative to prevent asynchronous engagement of the jaw members and to transmit the shift force to the friction members to increase synchronizing torque thereof; and self-energizing ramps reacting the torque to provide an additional force in the direction of and additive to the shift force for further increasing the synchronizing torque of the friction members.

SUMMARY OF THE INVENTION

An object of this invention is to provide self-energizing synchronizer for reducing shift time and improving shift quality.

According to a feature of the invention, a clutch as disclosed in U.S. Pat. No. 5,092,439 and representing the prior art as referred to in the pre-characterizing portion of claim 1, frictionally synchronizes and positive connects first and second drives disposed for relative rotation about a common axis. The clutch comprises first jaw means axially movable into engagement with second jaw means for positive connecting the drives in response to engaging movement of the first jaw means by an axially directed shift force ($F_o$). First friction means axially move into engagement with second friction means in response to the engaging movement of the first jaw means for producing a synchronizing torque. First and second blocker means move into engagement in response to the engaging movement of the first jaw means for preventing asynchronous engagement of the jaw means, for transmitting the shift force ($F_o$) to the first friction means to effect an engagement force of the friction means, and for producing a torque counter to the synchronizing torque for moving the first and second blocker means out of engagement as synchronization is reached. First and second self-energizing means having angled surfaces are operative when engaged to react the synchronizing torque for producing an additive axial force ($F_a$) in the direction of the shift force ($F_o$) for increasing the engagement force of the friction means. The engaged surfaces axially slide relative to each other in response to movement of the blocker means out of engagement as synchronization is reached.

BRIEF DESCRIPTION OF THE DRAWINGS

The self-energizing synchronizer mechanism of the invention is shown in the accompanying drawings in which:

FIG. 2 is a partially sectioned view of the mechanism looking along line 2—2 of FIG. 1;

FIGS. 5 and 5A are detailed views of a pin component and a plunger component in FIGS. 1 and 2;

FIG. 9 is a graphical representation of axial forces and torques acting on a shift flange of the synchronizer;

DETAILED DESCRIPTION OF THE DRAWINGS

The term "synchronizer clutch mechanism", used herein, shall designate a clutch mechanism utilized to non-rotatably couple a selected ratio gear to a shaft by means of a positive clutch in which attempted engagement of the positive clutch is prevented until members of the positive clutch are brought to substantially synchronous rotation by a synchronizing friction clutch associated with the positive clutch. The term "self-energizing" shall designate synchronizer clutch mechanism which includes ramps or cams or the like to increase the engaging force of the synchronizing clutch in proportion to the synchronizing torque of the friction clutch.

Figure 1:
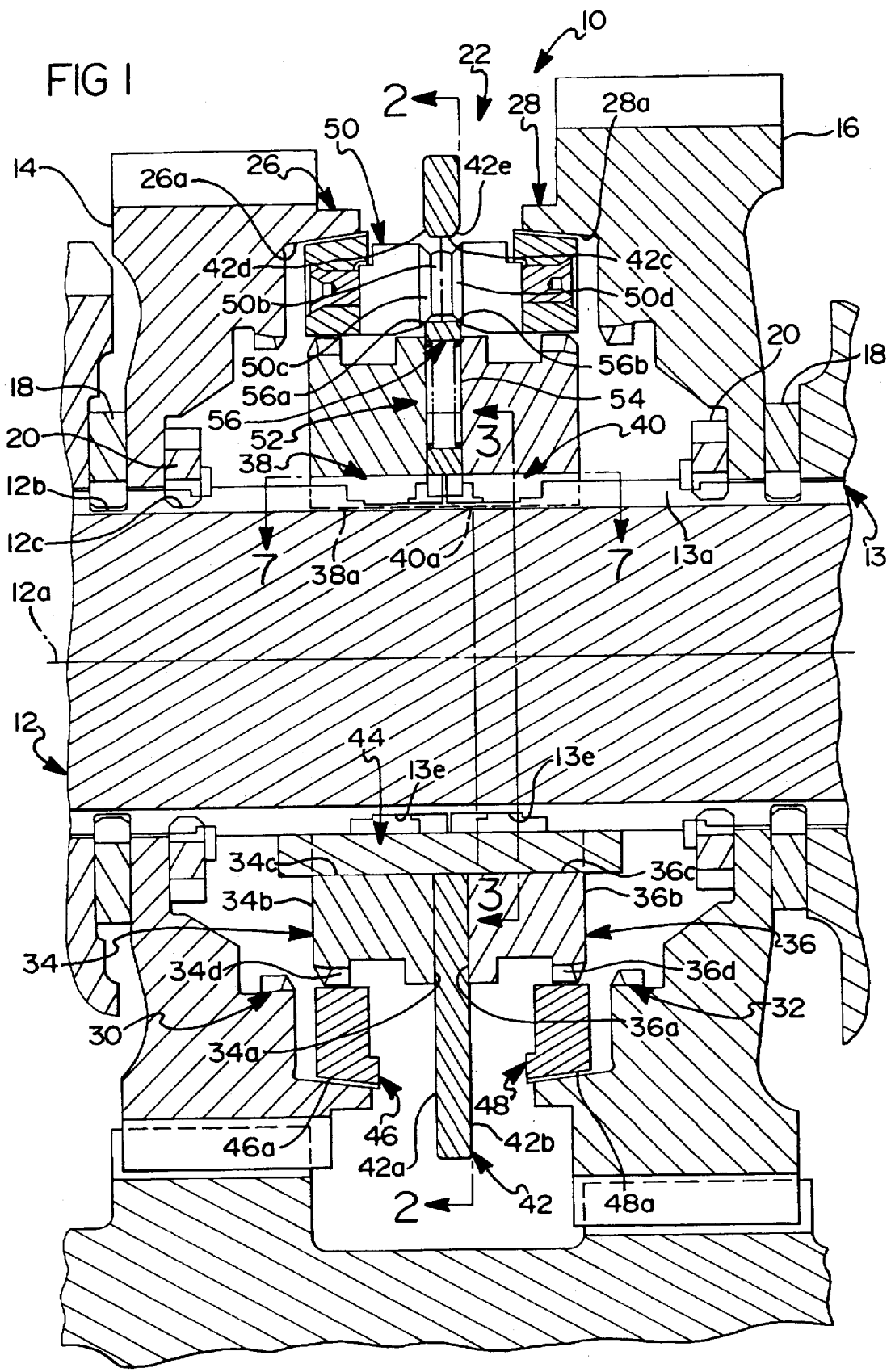
FIG. 1 is a sectional view of a double-acting synchronizer mechanism looking along line 1—1 of FIG. 2.
Figure 3:
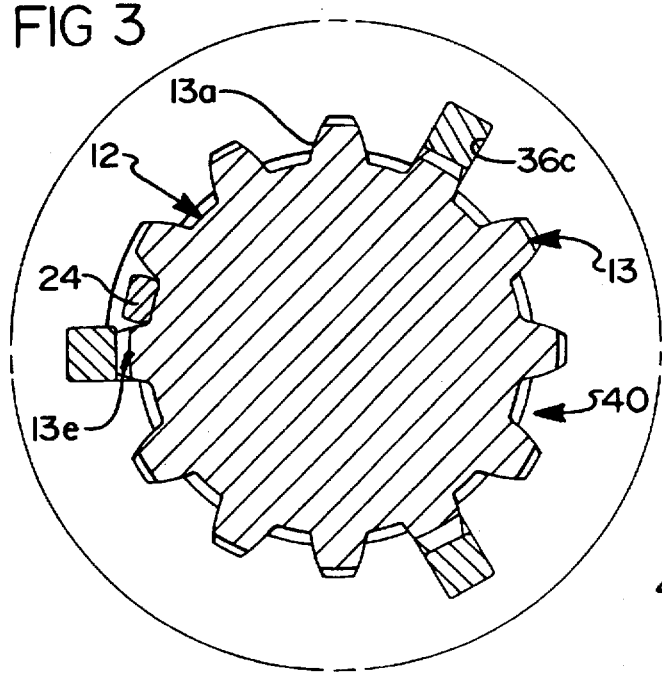
FIG. 3 is a sectional view of a portion of the mechanism looking along line 3—3 of FIG. 1.

Looking now mainly at FIGS. 1 and 2, therein is shown in detail a gear and synchronizer assembly 10 including a shaft 12 mounted for rotation about a central axis 12a, axially spaced apart gears 14,16 rotatably supported on the shaft and secured against axial movement relative to the shaft by annular thrust members 18,20 and a double-acting synchronizer clutch mechanism 22. Thrust members 18,20 are axially retained in annular grooves 12b, 12c in spline teeth 13 of the shaft and are affixed against rotation relative to the shaft by a retainer pin 24 (FIG. 2) disposed in a space between two of the teeth 13.

Figure 4:
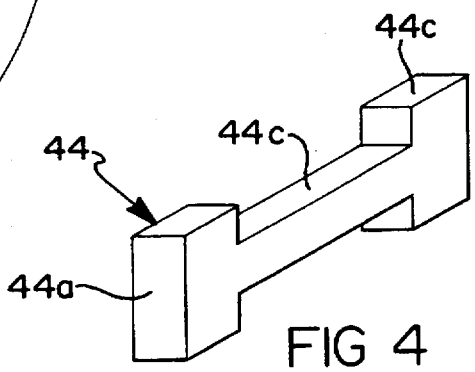
FIG. 4 is a perspective view of a component in FIGS. 1 and 2.

The synchronizer mechanism 22 includes annular friction member portions 26,28 and jaw clutch member portions 30,32 integrally formed with gears 14,16, jaw clutch members 34,36 having internal spline teeth 38,40 slidably mating with the external spline teeth 13 integrally formed with shaft 12 or otherwise affixed thereto, a radially extending shift flange 42 having axially oppositely facing sides 42a,42b sandwiched between axially facing surfaces 34a,36a of the jaw members 34,36, three H-shaped retainer members 44 (one of which is shown in perspective in FIG. 4) for securing the flange and jaw members against relative axial movement, annular friction members or rings 46,48 rigidly secured together by three circumferentially spaced apart pins 50 extending axially from each of the friction members and through openings 42c in the flange, and three pre-energizer and neutral centering assemblies 52 each including a spring 54 and a plunger 56 which reacts with surfaces defined by the pins. Alternatively, synchronizer mechanism 22 may be of the single-acting, pin-type, i.e., configured to synchronize and jaw clutch only one gear to a shaft; such a mechanism is disclosed in U.S. Pat. No. 3,221,851 which is incorporated herein by reference. Also, the number of retainers 44, pins 50, and assemblies 52 may be more or less than disclosed herein. Further, the synchronizer mechanism may be other than of the pin-type, for example, the synchronizer mechanism may be of the so called baulkring type.

As is readily seen, friction members 26,46 and 28,48 pair up to define friction clutches for synchronizing the gears to the shaft prior to engagement of the jaw clutches. Cone clutches are preferred; however, other types of friction clutches may be used. Friction members 26,28 may be affixed to the associated gears in any of several known ways. Friction members 26,28 have internal cone friction surfaces 26a,28a which respectively mate with external cone friction surfaces 46a,48a. Members 26,28 and 46,48 also are respectively referred to as synchronizer cups and rings.

A wide range of cone angles may be used; cone angles of seven and one-half degrees are employed herein. The friction surfaces 46a,48a and/or 26a,28a may be defined by any of several known friction materials affixed to the base member; herein, pyrolytic carbon friction materials, such as disclosed in U.S. Pat. Nos. 4,700,823; 4,844,218; and 4,778,548, are preferred. These patents are incorporated herein by reference.

Figure 5A:
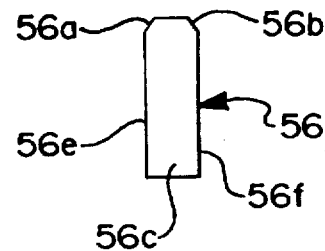

Pins 50 are shown in greater detail in FIG. 5. Each pin includes major diameter portions 50a having diameters slightly less than the diameter of flange openings 42c, a reduced diameter or groove portion 50b spaced between friction rings 46,48 (herein midway), conical blocker shoulders or surfaces 50c,50d extending radially outward from the pin axis and axially away from each other at angles herein of about forty degrees relative to a line normal to the pin axis, and preferably, but not necessarily, independent pre-energizer surfaces 50e,50f and extended secondary centering surfaces 50g,50h. The grooved portions, when disposed within their respective flange openings, allow limited rotation of the rigid friction ring and pin assembly relative to the flange to effect engagement of the pin blocker shoulders with chamfered blocker shoulders 42d,42e defined about the flange openings. The pre-energizer surfaces 50e, 50f chordally intersect or remove a portion of conical blocker shoulders 50c,50d, are preferably (but not necessarily) flat planar surfaces and form angles relative to the pin axis which are somewhat less than the angles of the blocker surfaces. Centering surfaces 50g,50h are also flat planar surfaces and, as is readily apparent in the drawings, form angles relative to the pin axis which are substantially less than the angles of the blocker and pre-energizer surfaces. As disclosed herein, the chordal extents of the flat surfaces are tangent to circles concentric to the pin axis and the shaft axis. Axial forces provided by the secondary centering surfaces should be sufficient to return flange 42 to its neutral position in the event that such positioning has not been completely effected by the shift mechanism for moving the flange.

Plungers 56 are biased radially outward toward the pin pre-energizer and centering surfaces by the helical compression springs 54 disposed in slots 42f of the flange. The major extents of the slots preferably, but not necessarily, extend radially relative to the shaft axis. The slots also extend axially through the flange sides 42a,42b, into flange openings 42c, and have ends 42a at their radially inward extent for the springs to react against. The radially inner portion of the springs may be retained by unshown means such as pegs extending radially outward from the slot ends. Plungers 56, may be formed of a sheet metal material, but are preferably formed of a cast or compacted material such as steel to provide structural rigidly and surface hardness. Each plunger 56 has a somewhat U-shaped cross-section with a closed end defining a head portion having flat angled surfaces 56a,56b for cooperating with the flat pre-energizer and centering surfaces of the associated pins 50. The sidewalls of each plunger have surfaces 50c, 50d for slidably cooperating with the radially extending sidewall surfaces of the slot 42f to retain the plunger in the circumferential direction. The plunger sidewalls also have surfaces 56e,56f for slidably cooperating with the axially facing, radially extending end surfaces 34a,36a of jaw members 34,36 to retain the plunger in the axial direction.

As previously mentioned, jaw members 34,36 include internal spline teeth 38,40 slidably mating with external spline teeth 13 affixed to the shaft. The external splines have involute flank surfaces 13a extending parallel to the shaft axis, and the mating thereof with flank surfaces of the jaw member splines prevents relative rotation therebetween. H-shaped members 44 each include end portions 44a,44b, which react against jaw member surfaces 34b,36b, and a center portion 44c which interconnects the end portions. The center portion extends snugly through axially extending slots 34c,36c in the jaw members and freely through openings 42h having radially extending stop surfaces 42n,42m which cooperate with center portion 44c to limit rotational movement of the flange relative to the jaw members and shaft for reasons explained herein after.

Figure 6:
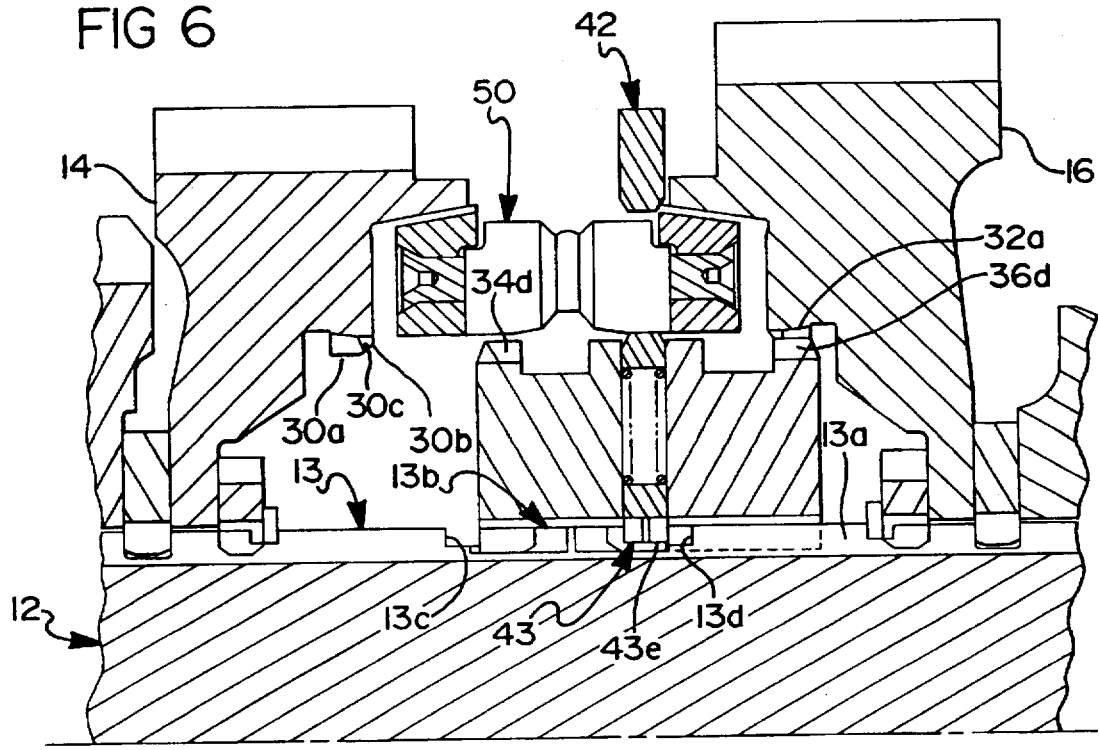
FIG. 6 is a partial view of the mechanism in FIG. 1 with a jaw clutch thereof in an engaged position.
Figure 7:
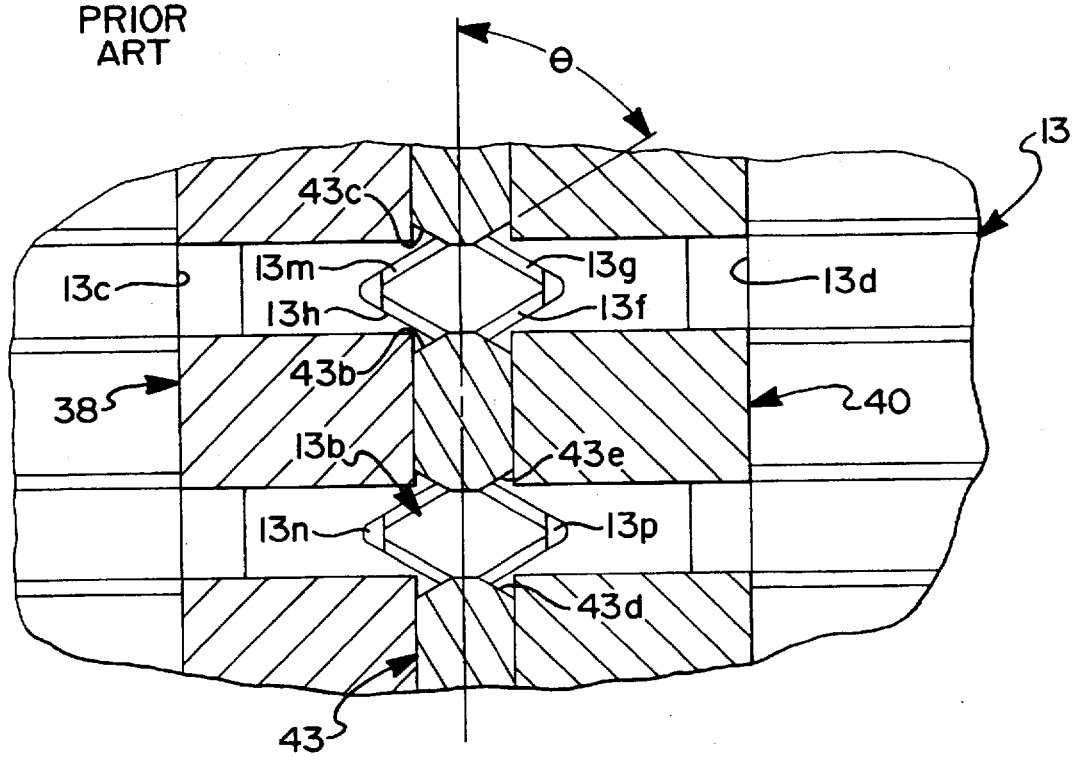
FIGS. 7 and 8 are sectional views of self-energizing ramp surfaces of the mechanism looking along line 7—7 of FIG. 1.

As best seen in FIGS. 1, 2 and 6–8, portions of external teeth 13 of the shaft in both axial directions from the FIGS. 1 and 7 neutral position of flange 42, are modified to provide one or more ramp surfaces which cooperate with a like number of ramp surfaces defined by reaction means or internal teeth 43 extending radially inward from flange 42 and into the axially extending spaces between shaft splines 13. The ramp surfaces allow limited rotation of the flange relative to jaw members 34,36 and shaft 12, and react synchronizing torque between the cone clutches and shaft to provide an additive axial self-energizing force for increasing the engaging force of the cone clutch initially engaged by a shift force applied to flange 42, thereby increasing the synchronizing torque provided by the cone clutch. Ramp surfaces may be provided for increasing synchronizing force for one or both gears and/or for increasing synchronizing force in response to torque in either direction, as is encountered for up and down shifts. More specifically, each tooth 13, circumferentially between each H-shaped retainer center portion 44c, has first and second axially spaced apart recesses defining annular grooves having first ends defined by a post-like portion 13b, axially opposite ends 13c, 13d, and minimum outside diameters 13e. The minimum outside diameters 13e are greater than the root diameter of splines 13 and greater than the inside diameters 38a,40a of the jaw clutch splines 38,40. Also, the minimum outside diameters 13e are less than the inside diameters 43a of internal teeth 43. The post-like portion 13b has a diamond-shape, formed by removing portions of each tooth in both axial directions therefrom. The axial and radial extent of the removed portions are selected to facilitate ease of machining boost ramp surfaces 13f, 13g, 13h, 13m on post portion 13b and to minimize the effects such removal has relative to the strength of the teeth. Further, spline teeth 13 are provided with sufficient radial depth to ensure that the ramp surfaces have enough surface area to minimize wear due to forces acting thereon. The axial extent of the removed portions or recesses between axial ends 13n,13p of post portion 13b and axial ends 13c, 13d of teeth 13 are formed by simply machining annular grooves in the teeth. The axial length of the removed portion is sufficient to facilitate insertion of a machining tool to form the ramp surfaces. Ramp surfaces 13f, 13g respectively react against ramp surfaces 43b,43c on flange teeth 43 to provide the additive axial forces to increase or assist the synchronization rate of gear 16 in response to torque in either direction. Ramp surfaces 13h, 13m respectively react against ramp surfaces 43d,43e to provide the additive axial forces for gear 14 in response to synchronizing torque in either direction. The angles of the ramp surfaces may be varied to provide different amounts of additive axial force for up and down shifts and for high and low speed ratios. Also, if no additive axial force is preferred in one direction for one gear or more, the ramp surfaces may be parallel to the spline teeth, i.e., no effective ramp surfaces are provided. The magnitude or amount of the axial additive forces, as explained further hereinafter, is also a function of the mean radii ratio of friction clutches and self-energizing ramps. Accordingly, the magnitude of the additive forces for a given shift force applied to shift flange 42 by a shift fork may be varied by varying the ramp angles and/or the mean radii ratio.

When the flange 42 is in the neutral position of FIGS. 1 and 7, reduced diameter portions 50b of pins 50 are radially aligned with their associated flange openings 42c, friction surfaces of the cone clutches are slightly spaced apart and are maintained in this spaced relation by angled pre-energizer surfaces 56a,56b of the plungers 56 acting on pre-energizer surfaces 50e,50f of pins 50 by the force of springs 54. The axial force provided by the pre-energizer surface is preferably sufficient to counter act any additive axial force on flange 42 by the self-energizing ramps due to viscous shear of oil between the cone clutch surfaces. When it is desired to couple either gear to the shaft, an appropriate and unshown shift mechanism, such as disclosed in U.S. Pat. No. 4,920,815 and incorporated herein by reference, is connected to the outer periphery of flange 42 in known manner for moving the flange axially along the axis of shaft 12 either left to couple gear 14 or right to couple gear 16. The shift mechanism may be manually moved by an operator through a linkage system, may be selectively moved by an actuator, or may be moved by means which automatically initiate shift mechanism movement and which also controls the magnitude of the force applied by the shift mechanism. When the shift mechanism is manually moved, the force is proportional to the force applied by the operator to a shift lever. Whether manually or automatically applied, the force is applied to flange 42 in an axial direction and is represented by the length of arrow $F_o$ in FIG. 9.

Initial rightward axial movement of flange 42 by the operator shift force $F_o$ is transmitted to the pins by pre-energizer surfaces 50f, 56b to effect initial frictional engagement of cone surface 48a with cone surface 28a. The initial engagement force of the cone surface is of course a function of the force of springs 54 and the angles of the pre-energizer surfaces. The initial frictional engagement (provided an asynchronous condition exists and momentarily ignoring the effect of the self-energizing ramps) produces an initial cone clutch engaging force and synchronizing torque $T_o$ which ensures limited relative rotation between flange 42 and the engaged friction ring, and hence, movement of the reduced diameter pin portions 50b to the appropriate sides of the flange openings 42c to provide engagement of pin blocker shoulders 50c with flange blocker shoulders 42d. When the blocker shoulders are engaged, the full operator shift force $F_o$ on flange 42 is transmitted to friction ring 48 via the blocker shoulders, whereby the cone clutch is engaged by the full force of the operator shift force $F_o$ to provide a resultant operator synchronizing torque $T_o$. This operator synchronizing torque $T_o$ is represented by arrow $T_o$ in FIG. 9. Since the blocker shoulders are disposed at angles relative to the axial direction of operator shift force $F_o$, they produce a counter force or unblocking torque which is counter to the synchronizing torque from the cone clutch but of lesser magnitude during asynchronous conditions. As substantial synchronism is reached, the synchronizing torque drops below the unblocking torque, whereby the blocker shoulders move the pins into concentric relation with openings 42c to allow continued axial movement of the flange and engagement of the external jaw teeth 36d of jaw member 36 with internal jaw teeth 32a of jaw member 32, as shown in FIG. 6. As is known in the prior art and as is specified by reference numbers only for jaw teeth 30a of jaw member 30 in FIG. 6, the lead portions of the jaw teeth have rake leading edges 30b to reduce tooth damage during initial contact, and have chamfer or wedge faces 30c to clock the teeth into mating alignment. Jaw teeth with such lead portions are disclosed in greater detail in U.S. Pat. No. 4,246,993 which is incorporated herein by reference along with U.S. Pat. No. 3,265,173 which provides a teaching for the proper rake angles. The wedge faces, which may be asymmetric, prevent delay of shift completion due to abutting contact of the leading edges of the teeth. To facilitate smooth and relatively effortless completion of shifts, the jaw teeth are preferably as fine or small, as practicable, in the circumferential direction, thereby minimizing the number or rotational clocking degrees necessary to matingly align the jaw teeth. Also, the jaw teeth are preferably disposed about as large a diameter as is practicable.

Still ignoring the effects of the self-energizing ramps, cone clutch torque provided by the force $F_o$ is expressed by equation (1).

$$T_o = F_o R_c \mu_c / \sin \alpha \qquad (1)$$

where:
$R_c$=the mean radius of the cone friction surface,
$\mu_c$=the coefficient of friction of the cone friction surface, and
$\alpha$=the angle of the cone friction surfaces.

Figure 8:
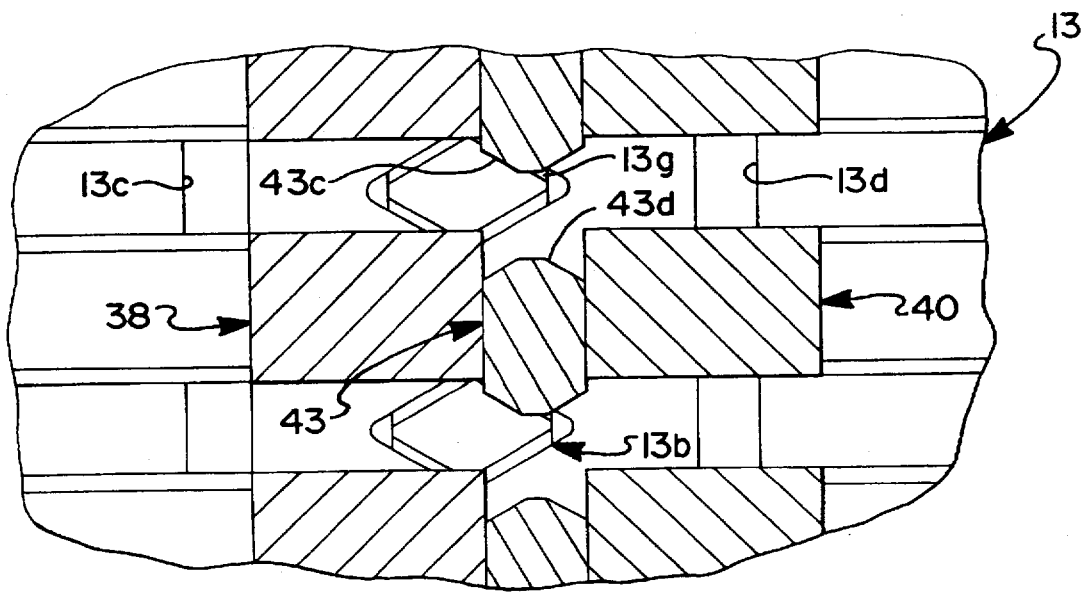

Looking now at the affects of the self-energizing ramps and referring particularly to FIGS. 7 and 8, the synchronizing torque $T_o$, due to the operator applied axial shift force $F_o$, is of course transmitted to flange 42 by pins 50 and is reacted to shaft 12 across the self-energizing ramp surfaces. The self-energizing ramp surfaces, when engaged, limit rotation of the flange relative to shaft 12 and jaw members 34,36, and produce an axial force component or axial additive force $F_a$ acting on the flange in the same direction as shift force $F_o$, thereby further increasing the engaging force of the cone clutch to provide an additive synchronizing torque $T_a$ which adds to the torque $T_o$. FIG. 7 illustrates the position of the self-energizing ramp surfaces and the position of the jaw member splines 38,40 to the shaft splines 13 while shift flange 42 is in the neutral position corresponding to the position of FIG. 1. FIG. 8 illustrates a position of the ramps and splines while gear 16 is being synchronized by engaged cone surfaces 28a,48a. The engaged cone surfaces are producing a synchronizing torque in a direction which has effected engagement of flange member ramp surfaces 43c with shaft ramp surfaces 13g. Hence, the sum of the axial forces for engaging the cone clutch are $F_o$ plus $F_a$ and the sum of the synchronizing torques being produced by the cone clutch are $T_o$ plus $T_a$, as graphically shown in FIG. 9. For a given operator shift force $F_o$ and an operator synchronizing torque $T_o$, the magnitude of the axial additive force is preferably a function of the angle of the engaged self-energizing ramp surfaces. This angle is preferably great enough to produce an additive force $F_a$ of magnitude sufficient to significantly increase synchronizing torque and decrease synchronizing time in response to a given moderate shift effort by the operator. However, this angle is also preferably low enough to produce a controlled axial additive force $F_a$, i.e., the force $F_a$ should increase or decrease in response to the force $F_o$ increasing or decreasing. If the ramp angle is too great, the ramps are self-locking rather than self-energizing; hence, once initial engagement of the cone clutch is effected the force $F_a$ will rapidly and uncontrollably increase independent of the force $F_o$, thereby driving the cone clutch toward lockup. Self-locking rather than self-energizing decreases shift quality or shift feel, may over stress synchronizer components, may cause over heating and rapid wear of the cone clutch surfaces, and may even override operator movement of the shift lever.

The main variables for calculating self-energizing ramp angles θ and for providing additive axial forces $F_a$, which increase or decrease in proportion to operator forces $F_o$, are cone clutch angle α, cone clutch coefficient of friction $\mu_c$, mean radii ratio $R_c$ of the cone clutch and $R_r$ of the self-energizing ramps, ramp coefficient of friction $\mu_r$, and angle of the self-energizing ramps.

The total synchronizing torque $T_t$ produced by the cone clutch is:

$$T_t = F_t R_c \mu_c / \sin\alpha \tag{2}$$

where $$T_t = T_o + T_a \tag{3}$$

and $$F_t = F_o + F_a \tag{4}$$

The equation for the axial additive force $F_a$, which is given without derivation, is $$F_a = F_{tan} \frac{\cos\theta - \mu_r \sin\theta/\cos\phi}{\sin\theta + \mu_r \cos\theta/\cos\phi} \tag{5}$$

where the ramp angle θ is measured from a plane normal to shaft axis 12a, and $F_{tan}$ acts on the ramps and is the tangential force component of torque $T_t$ at $R_r$. $T_t$ and $F_{tan}$ for one torque direction are respectfully represented by like referenced arrows in FIG. 2. Further details for calculating and controlling self-energizing or boost forces may be obtained by reference to U.S. Pat. No. 5,092,439 which is incorporated herein by reference.

Figure 10:
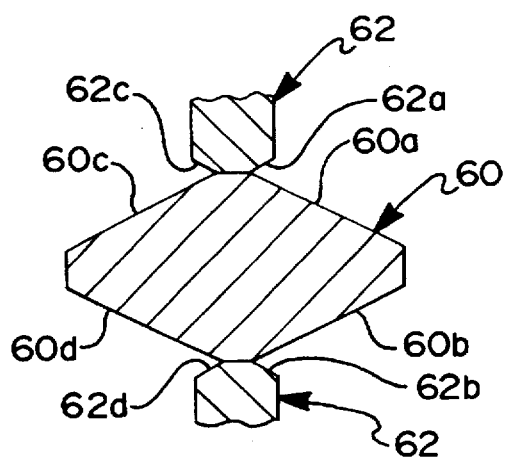
FIG. 10 is graphical representation of the self-energizing ramp surfaces in FIG. 7.

Elements 60 and 62 in FIG. 10 are respectively schematic representations of post-like portion 13b and internal tooth 43 in FIG. 7. Ramp surfaces 60a, 60b, 60c, 60d and 62a, 62b; 62c, 62d defined by elements 70, 72 react against each other in the same manner as described for FIGS. 7 and 8. FIG. 10 is shown to clarify the transition from the ramp surfaces in FIG. 7 and 8 to the ramp surfaces in FIGS. 11–13.

Figure 11:
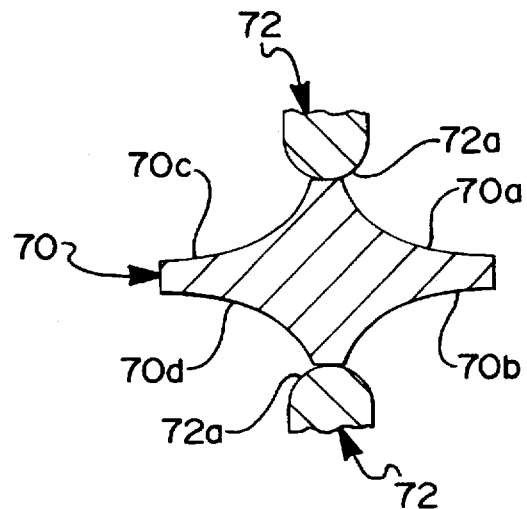
FIGS. 11–13 are graphical representations of improved self-energizing ramp surfaces.
Figure 12:
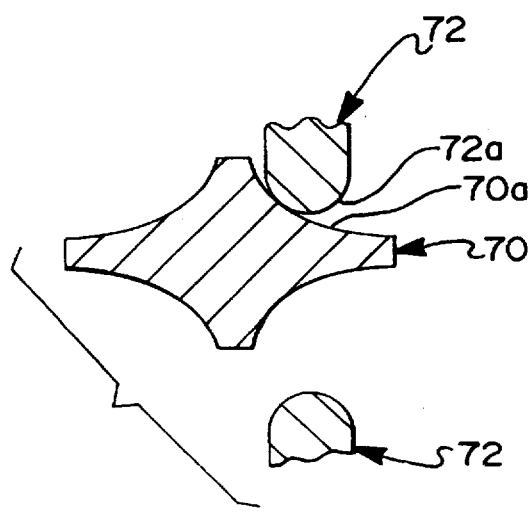
Figure 13:
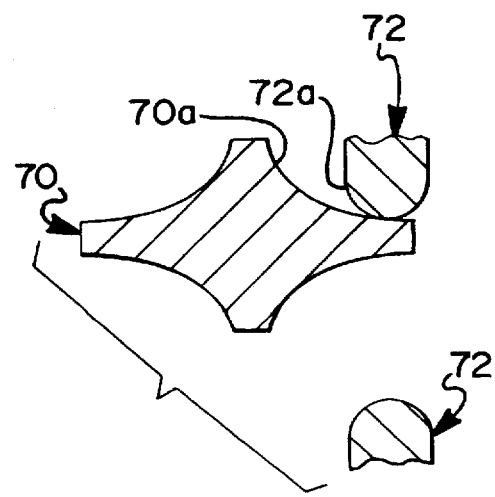

FIGS. 11–13 schematically illustrate elements 70 and 72 respectively analogous to post-like portion 60 and internal tooth 62 in FIG. 10, and respectively having curvilinear ramp surfaces 70a, 70b, 70c, 70d and 72a providing active ramp angles θ therebetween which vary over their length of engagement in lieu of the constant angle 8 provided by the ramp surfaces of elements 60, 62. The curvilinear ramp surfaces, particularly surfaces 70a–70d, may each be defined by a series of flat surfaces which collectively define a curved ramp. The curvilinear surfaces have several advantages over the constant ramp angle surfaces of the prior art. For example, the curvilinear surfaces provide a relatively high additive axial force (Fa) while the blocker surfaces of pin 50 and shift flange 42 are engaged and then a lesser axial force (Fa) during unblocking of the shift flange as synchronization is approached. The lesser axial force (Fa) contributes to quick unblocking, decreased rates of acceleration/ deceleration of components as they approach synchronization, reduced speed differential during indexing of the jaw clutch members, reduced notchiness during shift completion, reduced clashing of the jaw clutch teeth, improved shift effort, etc.

FIG. 11 illustrates the position of the self-energizing ramp surfaces while shift flange 42 is in the neutral position of FIG. 1. FIG. 12 illustrates the position of the self-energizing ramp surfaces while the shift flange is being blocked. And FIG. 13 illustrates the position of the self-energizing ramp surfaces as the jaw clutches approach engagement after the shift flange is unblocked.

A preferred embodiment of self-energizing synchronizer mechanism has been disclosed. Many variations and modifications of the preferred embodiment are believed to be within the spirit of the invention. The following claims are intended to cover the inventive portions of disclosed mechanism and variations and modifications believed to be within the spirit of the invention.

What is claimed is:

1. A clutch for frictionally synchronizing and positive connecting first and second drives disposed for relative rotation about a common axis; the clutch comprising:

first jaw means axially movable into engagement with second jaw means for positive connecting the drives in response to engaging movement of the first jaw means by an axially directed shift force ($F_o$).

first friction means axially movable into engagement with second friction means in response to the engaging movement of the first jaw means for producing a synchronizing torque;

first and second blocker means movable into engagement in response to the engaging movement of the first jaw means for preventing asynchronous engagement of the jaw means, for transmitting the shift force ($F_o$) to the first friction means to effect an engagement force of the friction means, and for producing a torque counter to the synchronizing torque for moving the first and second blocker means out of engagement as synchronization is reached;

first and second self-energizing means having angled surfaces operative when engaged to react the synchronizing torque for producing an additive axial force ($F_a$) in the direction of the shift force ($F_o$) for increasing the engagement force of the friction means, the engaged surfaces axially slidable relative to each other in response to movement of the blocker means (42e, 50d) out of engagement as synchronization is reached; characterized by:

the angled surfaces of the first self-energizing means having angles that vary along their axial extent of sliding engagement with the engaged angled surfaces of the second self-energizing means for varying the magnitude of the additive axial force ($F_a$) as the engaged surfaces axially slide relative to each other.

2. The clutch of claim 1, wherein:

the angled surfaces of the first self-energizing means vary in a direction for decreasing the magnitude of the additive axial force (Fa) as the second jaw means moves toward the first jaw means.

3. The clutch of claim 2, wherein:

the angled surfaces of the first self-energizing means are affixed against rotation relative to the first jaw means.

4. The clutch of claim 2, wherein:

the angled surfaces of the first self-energizing means are curvilinear.

5. The clutch of claim 4, wherein:

the angled surfaces of the first self-energizing means are affixed against rotation relative to the first jaw means.

6. The clutch of claim 1, wherein:

the angled surfaces of the first self-energizing means are curvilinear.

7. The clutch of claim 3, wherein:

the angled surfaces of the first self-energizing means are affixed against rotation relative to the first jaw means.

8. The clutch of claim 1, wherein:

the angled surfaces (70a) of the first self-energizing means are affixed against rotation relative to the first jaw means (34d).

* * * * *